July 31, 1962 — H. SCHULLER — 3,047,024
SLIDE VALVE
Filed Sept. 19, 1958 — 2 Sheets-Sheet 1

INVENTOR
Heri SCHULLER

July 31, 1962  H. SCHULLER  3,047,024

SLIDE VALVE

Filed Sept. 19, 1958  2 Sheets-Sheet 2

INVENTOR
Heri SCHULLER
BY Leon M. Straus
AGT.

United States Patent Office 3,047,024
Patented July 31, 1962

3,047,024
SLIDE VALVE
Heri Schuller, Rohrbach (Saar), Germany, assignor to Th. Jansen G.m.b.H., Rohrbach (Saar), Germany, a firm of Germany
Filed Sept. 19, 1958, Ser. No. 762,050
Claims priority, application Germany Sept. 20, 1957
9 Claims. (Cl. 138—94.3)

The present invention relates to improvements in gate type shut-off valves for gas lines, and more particularly to such a valve consisting of a central housing part with pipe joints rigidly secured thereto for connecting the valve to a gas line, a short sealing pipe axially adjustable within the housing part and connected thereto near one end by means of a corrugated tubular diaphragm, and provided with a sealing surface at its other free end opposite to a corresponding sealing surface on the central housing part, and a spectacle gate slidably disposed between the two mentioned sealing surfaces and also having sealing surfaces at both sides which are adapted to be pressed against the former sealing surfaces by a force acting upon the axially adjustable sealing pipe within the valve housing when the gate is in one of its two desired positions.

Such gate type shut-off valves which are used especially for blast furnace gas lines and are usually mounted outside must always be safe and absolutely tightly closable.

In the known types of such valves, the inner sealing pipe is adjustable in the axial direction, for example, by means of eccentric shafts or spindles, or by means of rollers which are pressed against the sealing pipe, for example, by means of a rotary ring and inclined cam surfaces. In all of these valve designs there are four or more contact points. They are therefore very complicated and of expensive construction since they either require several eccentric shafts or spindles, or rollers at both sides of the valve which must be driven absolutely equally which is possible only by means of chain, gear, or spindle drives. However, it is well-known that such parts, and especially eccentric pressure surfaces, spindles, or wedge surfaces, are very easily affected by dust. This also applies to a mechanism in which a single annular pressure arm which is pivotably mounted on the central part of the housing engages on the sealing pipe at two diametrically opposite points thereof, and in which the sealing pipe is movably connected with the central housing part by means of wedge surfaces in such a manner that it will be movable in the axial direction of the pipe line. All deposits of dust and other matter settling on these parts obstruct the ability of the slide valve to function properly. However, especially blast-furnace gas lines usually carry an extremely great amount of dust which comes especially out of the inside of the pipe lines when the slide valve is being opened or occurs in the form of flying dust. For this reason, the mentioned valve designs are unsuitable for pipe lines carrying blast-furnace gases.

It is an object of the present invention to provide a gate type slide valve which avoids the above-mentioned disadvantages of previous valve designs and has a more simple and reliable operating mechanism for adjusting the sealing pipe, and which is designed so as to be entirely unaffected by dust.

A further object of the invention is to provide a slide valve of the aforementioned type which is designed so as to permit the sealing pipe together with the corrugated tubular diaphragm to be removed from the valve housing in a very simple manner and without requiring any disassembly of the valve housing.

These objects of the present invention are attained by a combination of features which consist in the provision of two pressure levers which engage on the sealing pipe at two diametrically opposite points thereof and are pivotably mounted on the central part of the valve housing for shifting the sealing pipe in the axial direction, and of two guide rods for supporting and guiding the sealing pipe in its movement in the axial direction which are pivotably mounted at opposite sides of the sealing pipe and on the central housing part in such a manner that the pressure levers and guide rods are pivotable within parallel planes. The combination according to the invention further includes a plurality of compression springs which are mounted between and act in an axial direction upon the central housing part and the sealing pipe and tend to press the sealing pipe constantly in the direction toward the sealing surfaces. The tension of these compression springs may, if necessary, be easily adjusted from the outside of the valve housing by means of setscrews or the like. The central housing part containing the sealing pipe is made of a rectangular cross section and is open in two opposite directions in which the pivotable means for operating and guiding the sealing pipe are located. It is another feature of the inventive combination that the pivotal guide rods which extend into the central housing part from one open side thereof are made of a length considerably in excess of the distance of the axial adjusting movement of the sealing pipe.

In order to insure that the two pressure levers will always move simultaneously, each of them is actuated through a connecting rod by means of a rocking lever, and these two levers are pivotable simultaneously by being mounted on a single shaft which may be rotated by a spindle drive. An equal pressure of the sealing pipe at all points of the sealing surfaces and thus a proper sealing action of the valve may be attained by a suitable adjustment of the length of each of the two mentioned connecting rods between the rocking levers and the pressure levers and also of the length of each of the two pivotable guide rods by means of interposed tensioning screws which are provided with fine screw threads.

For preventing the occurrence of excessive forces within the driving elements of the two pressure levers, adjustable torque-responsive coupling means may be inserted between these elements. These coupling means preferably include a plurality of conical spring disks which are mounted within the connecting rods for operating the pressure levers and are effective in the direction of the pressure exerted by the pressure levers.

The invention further includes the use of compressed air nozzles which are mounted directly above the spectacle gate for blowing off any dust which might have collected on the gate before the actuation thereof. Finally, one or more steam nozzles may also be mounted above the sealing surfaces for deicing the valve and thus maintaining it in proper operative condition when exposed to freezing temperatures.

Further objects, features, and advantages of the present invention will become apparent from the following detailed description thereof which is to be read with reference to the accompanying drawings, in which—

FIGURE 3 shows a cross section taken along line III—III of FIGURE 1; while

Figure 1:
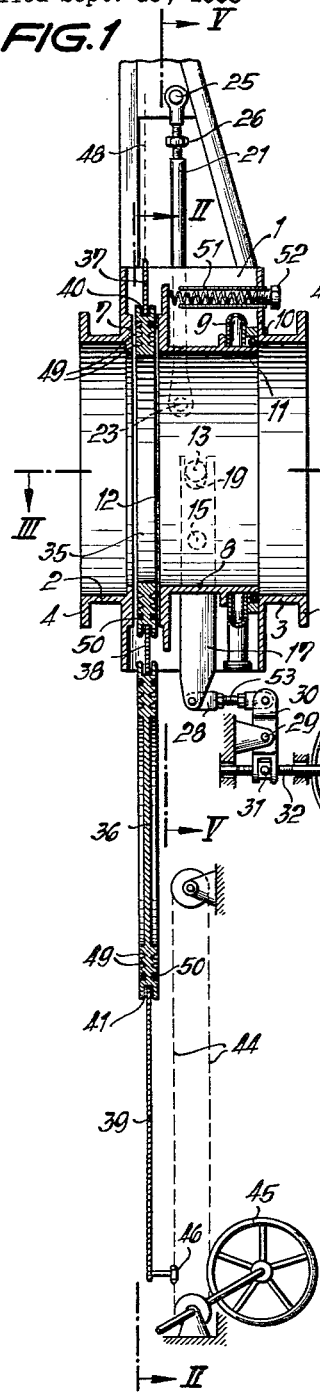
FIGURE 1 shows a vertical cross section of the slide valve according to the invention.
Figure 2:
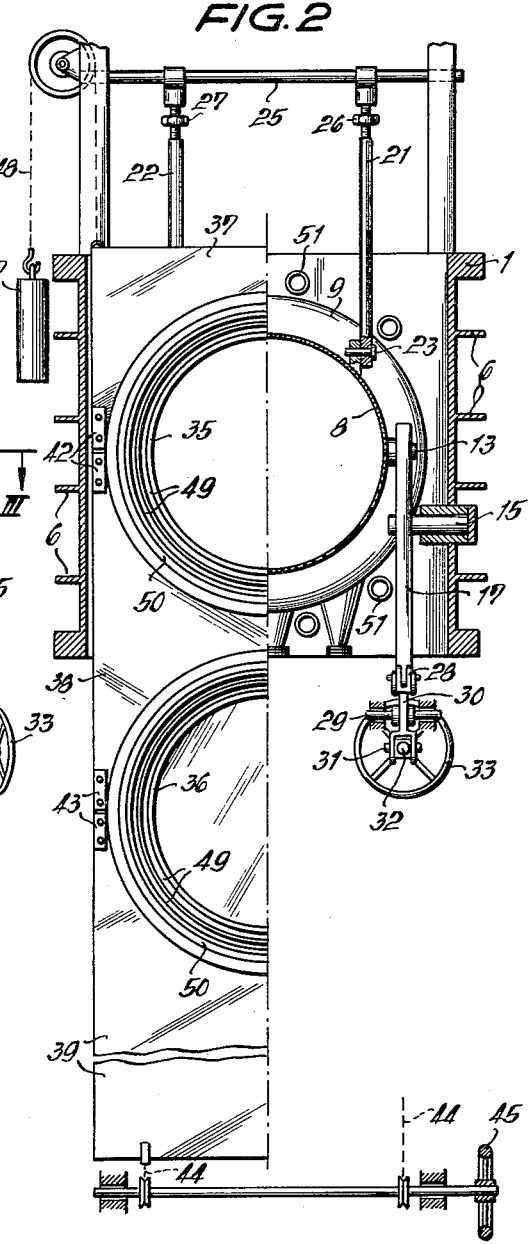
FIGURE 2 shows a cross section, the left half of which is taken along line II—II of FIGURE 1, while the right half is taken along line V—V of FIGURE 1.
Figure 3:
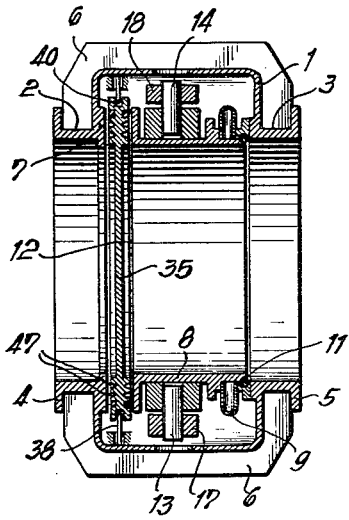

Referring to the drawings, the housing of the gate type slide valve according to the invention has a central part 1 which is open at its upper and lower ends and has two pipe joints 2 and 3 laterally secured thereto, the outer ends of which are provided with flanges 4 and 5, respectively, for connecting the same to pipe lines. The central housing part 1 which is of a rectangular cross section is also reinforced by outwardly projecting ribs 6. The place of connection of pipe joint 2 with the housing part 1 forms an annular sealing surface 7. The sealing pipe 8 within the central housing part is connected at one end to the point of connection of pipe joint 3 with the housing part 1 and is axially adjustable by means of a diaphragm 9 consisting of a corrugated tubular member which is secured to housing part 1 by means of bolts 10. The connecting surfaces between diaphragm 9 and housing part 1 are sealed by an asbestos ring 11. The other end of pipe 8 is flanged to form a sealing surface 12 and faces toward the corresponding sealing surface 7 on pipe joint 2 or housing part 1.

The side wall of sealing pipe 8 is provided at diametrically opposite points with two bolts or pins 13 and 14. Two pressure levers 17 and 18 which are pivotally mounted on pivots 15 and 16 on the wall of the central housing part 1 are each provided at one end with a slotted aperture 19 or 20 engaging over pins 13 and 14, respectively, and serve for shifting pipe 8 in the axial direction. Apart from its connection to the housing by means of the corrugated tubular diaphragm 9, pipe 8 is also suspended within housing part 1 by means of two guide rods 21 and 22 which are pivotally connected at one end to pipe 8 by pivots 23 and 24 and at the other end to a rod 25 which is secured to the upper part of the valve housing. Pressure levers 17 and 18 and guide rods 21 and 22 are mounted with respect to each other in such a position that the path of the pivotal movement of levers 17 and 18 will always be in a plane parallel to that of rods 21 and 22, while the pivot points 23 and 24 are disposed as closely as possible to the sealing end of pipe 8. Since guide rods 21, 22 have a considerable length as compared to the short distance which sealing pipe 8 has to be moved, this pipe will thus be guided in a straight direction. The length of guide rods 21, 22 may also be adjusted by means of tightening screws 26, 27 so as to insure that the sealing surfaces 7 and 12 will always be parallel to each other.

The mechanism for adjusting each pressure lever 17 and 18 to release sealing pipe 8 and then again to produce the required contact pressure thereof consists of a connecting rod 28 which is pivotally secured at one end to the lower end of the respective pressure lever 17 or 18 and at the other end to a rocking lever 30 which is secured to a shaft 29. This shaft is rotatably mounted in bearings which are secured to the valve housing and it also carries the other rocking lever 30 rigidly secured thereto so that when one rocking lever 30 is pivoted, the other will pivot likewise. The pivoting movement of both rocking levers 30 is produced by an encased spindle drive 31, 32 which is connected to one of these levers and may be operated either by hand by means of a hand wheel 33 or by suitable pneumatic, electric, or hydraulic means.

Figure 4:
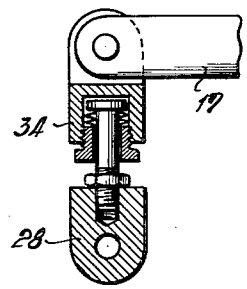
FIGURE 4 shows a cross section of one of the connecting rods which is pivotably secured to each pressure lever.

In order to avoid the occurrence of excessive forces within connecting rods 28, each of them is preferably provided with suitable spring means, for example, in the form of conical spring disks 34, as illustrated in FIGURE 4, which are effective in the direction in which the pressure is to be exerted.

Sealing surface 7 on the inner end of pipe joint 2 and sealing surface 12 on sealing pipe 8 are separated by the double or spectacle slide gate. It consists in the conventional manner of a circular ring 35, a likewise circular solid disk 36, and supporting plates 37, 38, and 39 which engage into annular grooves 40 and 41 in the outer periphery of gate ring 35 and gate disk 36, respectively. These annular grooves are made of such a width as to allow ring 35 and disk 36 to be movable therein in the axial direction. The adjacent supporting plates 37, 38 and 38, 39 are secured to each other by straps 42 and 43, respectively.

The slide gate may be guided in the known manner by means of rollers which are mounted on the valve housing at both sides of the gate. The operation of the gate is carried out by a handwheel 45 acting on a double chain drive 44 which is connected in a suitable manner, for example, by members 46, to the gate. The other end of the gate is suspended on a cable 48 which carries a counterweight 47. In the event of a horizontal installation of the gate, the counterweight 47 and cable 48 may be omitted. Obviously, instead of using a handwheel 45 for operating the gate it is also possible to use an electric motor while a spindle or rack drive may also be substituted for the chain drive 44, although the latter would be preferable since it is much less affected by dust. The slide gate may also be protected from collecting dust by a cover plate, not shown, which is secured to the valve housing. Nozzles may also be provided directly above the gate whereby any dust which might have collected thereon may be blown off by compressed air before every actuation of the gate.

Furthermore, if necessary, one or more steam nozzles may be provided above the gate in order to insure a proper operation thereof when there is a danger of ice formation.

The valve housing, the adjustable sealing pipe 8, and the corrugated tubular diaphragm 9 are made of steel plate, while gate ring 35 and gate disk 36 are normally made of cast iron or steel. The sealing surfaces of ring 35 and disk 36 are also provided with labyrinth grooves 49, one or more of which may be filled on each side concentrically to each other with gasket rings 50 to provide a gastight seal. These gasket rings preferably consist of rubber or a heat-resistant mixture of rubber and asbestos. If several concentric rings 50 are provided on each side, they may also be made of different materials, such as rubber and asbestos. However, each gasket ring 50 may also have two concentric bulges which are separated by labyrinth like grooves.

Furthermore, a plurality of compression springs 51 are uniformly distributed around the periphery of the adjustable pipe 8 between the central housing part 1 and the flanged end of sealing pipe 8. The tension of these springs 51 is adjustable from the outside of the housing by setscrews 52 or the like.

The operation of the slide valve according to the invention is as follows:

At first, by an adjustment of pressure levers 17 and 18, sealing pipe 8 is released from its contact with the sealing surface of gate ring 35 or gate disk 36. By means of chain drive 44 or other suitable mechanism, the gate is then moved either upwardly or downwardly to the desired position, or, if the gate is movable horizontally, in a lateral direction, whereupon sealing pipe 8 is again tightened against ring 35 or disk 36. A proper sealing action between pipe 8 and pipe joint 2 relative to gate ring 35 or gate disk 36 requires the sealing surface 7 of pipe joint 2 to be absolutely parallel to the sealing surface 12 of pipe 8. This may be attained by a suitable adjustment of screws 26 and 27 on suspension rods 21 and 22. Each of the two connecting rods 28 is also provided with a tightening screw 53 for adjusting the length of the respective rod. Screws 26, 27, and 53 have fine threads and are easily accessible from the outside. The contact pressure of sealing pipe 8 attainable by the two pressure levers 17 and 18 is amplified by the action of the compression springs 51 which exert a constant resilient pressure upon the sealing surfaces of the gate and valve housing and thus insure a reliable sealing action even though the mentioned sealing surfaces might have become slightly distorted relative to each other.

When the adjustable pipe 8 is loosened by means of the two pressure levers 17 and 18, compression springs 51 will at the same time be drawn backwardly and thereby be tightened. Consequently, they will assist in the subsequent operation of pressure levers 17 and 18 of pressing pipe 8 forwardly and against gate ring 35 or gate plate 36 and these in turn, against the sealing surface 7 on pipe joint 2 and housing part 1. The sealing action attained by pressure levers 17 and 18 and compression springs 51 is very strong and reliable and absolutely unaffected by dust.

After a removal of bolts 10, it is easily possible to remove the adjustable sealing pipe 8 and the corrugated tubular diaphragm 9 from the valve housing without requiring a disassembly of the latter.

Although my invention has been illustrated and described with reference to the preferred embodiments thereof, I wish to have it understood that it is in no way limited to the details of such embodiments, but is capable of numerous modifications within the scope of the appended calims.

Having thus fully disclosed my invention, what I claim is:

1. A gate type slide valve for gas lines comprising a housing having a central part, pipe sockets secured to two opposite sides of said housing part, a sealing pipe disposed between said pipe sockets within said housing part and axially slidable therein, a corrugated tubular member forming a diaphragm flexibly connecting one end of said sealing pipe to said housing part, the other end of said sealing pipe having a sealing surface, a corresponding sealing surface on the inner side of said housing part opposite to said first sealing surface, and a spectacle gate slidably disposed between said sealing surfaces for movement between the open and closed positions of said gate, said gate also having sealing surfaces at both sides thereof, the adjacent sealing surfaces of said sealing pipe, said housing part, and said gate being adapted to be pressed against each other in the open and close positions of said gate, a pair of pressure levers pivotally mounted on said housing part and connected to said sealing pipe at diametrically opposite points thereof for shifting said sealing pipe in the axial direction, a pair of guide rods pivotably mounted at one end on said housing part independently of said pressure levers and at the other end on said sealing pipe at opposite sides thereof and above said diametrically opposite points at a location spaced from said pivotal connection of said pressure levers to said sealing pipe substantially by an amount equal to the spacing between the connections of said pressure levers to said sealing pipe and said lever pivotal mounting on said housing part for guiding said sealing pipe in its longitudinal direction, compression springs mounted between said housing part and said sealing pipe and extending parallel to the axis of said sealing pipe and tending to press said sealing pipe in the direction toward said sealing surfaces, and means for adjusting the tension of said springs from the outside of said housing part.

2. A slide valve as defined in claim 1, further comprising means for pivoting said pressure levers to shift said sealing pipe in the axial direction, said means comprising a shaft, bearing means for rotatably mounting said shaft on said housing, a pair of rocking levers secured to said shaft, a pair of connecting rods, each pivotably connected to one of said pressure levers and to one of said rocking levers at one end thereof, and a spindle drive engaging on the other end of one of said rocking levers for pivoting both rocking levers simultaneously.

3. A slide valve as defined in claim 2, further comprising means for adjusting the length of each of said guide rods and each of said connecting rods for attaining a uniform pressure of said sealing pipe on said sealing surfaces.

4. A slide valve as defined in claim 2, further comprising adjustable torque-responsive coupling means interposed between said spindle drive and said pressure levers.

5. A gate type slide valve comprising a housing including a first pipe socket having a flat flange forming a valve seat, a second pipe socket axially spaced therefrom, and a central part telescopically engaging said second pipe socket and having a flat flange forming a valve seat opposed to the valve seat of said first pipe socket, diaphragm seal means connected to said central part and to said second pipe socket at the location of their telescopic engagement, resilient biasing means acting at a plurality of spaced locations around the periphery of said central part and biasing the latter toward said first pipe socket, a gate valve disposed between said first pipe socket valve seat and said central part valve seat and including a ring portion having an annular sealing surface on each side thereof and a disc portion having an annular sealing surface on each side thereof connected to said ring portion, each of said ring portion and said disc portion being selectively movable into a location with the sealing surfaces thereof disposed between said valve seats and with the respective central portions respectively opening and closing the interior of said first and second pipe sockets, and lever means connected to said central part movable to displace said central part axially in both directions including a pair of guide rods pivotally connected at their one end to said housing at spaced locations thereon and pivotally connected to said central part at respective sides thereof at horizontally aligned locations spaced from the center of said central part, a pair of pressure levers pivotally connected to respective diametrically opposite sides of said central part at the center thereof and each being pivotally connected to said housing at locations spaced from the center of said central part by an amount substantially equal to the spacing between the pivotal connections of said guide rods and the center of said central part, and means connected to the free ends of said pressure levers to pivot the levers to cause axial displacement of said central part.

6. A gate type slide valve according to claim 5, wherein said resilient biasing means includes a compression spring and means for adjusting the biasing force of said spring.

7. A gate type slide valve according to claim 5, wherein said lever means includes independently controllable levers connected to each side of said central part.

8. A gate type slide valve according to claim 5, including hand wheel means for actuating said lever means.

9. A gate type slide valve according to claim 5, wherein the connection between said ring portion and said disc portion of said gate valve includes a member movable axially in respect to each of said portions whereby to permit relative movement thereof during sealing engagement.

References Cited in the file of this patent

UNITED STATES PATENTS

| | | |
|---|---|---|
| 1,342,620 | Bradshaw | June 8, 1920 |
| 1,442,204 | Wilson | Jan. 16, 1923 |
| 1,727,677 | Siebert | Sept. 10, 1929 |
| 1,762,818 | Hoffman | June 10, 1930 |
| 2,011,767 | Juengling | Aug. 20, 1935 |
| 2,156,967 | Brosius | May 2, 1939 |
| 2,229,165 | Bowland | Jan. 21, 1941 |
| 2,299,124 | Boynton | Oct. 20, 1942 |
| 2,668,558 | Bowland | Feb. 9, 1954 |